Jan. 21, 1969

D. M. A. CHARPILLOZ 3,422,543

FEELING HEAD FOR MEASURING A PLURALITY
OF DIMENSIONS OF A WORKPIECE

Filed April 24, 1967

United States Patent Office
3,422,543
Patented Jan. 21, 1969

3,422,543
FEELING HEAD FOR MEASURING A PLURALITY OF DIMENSIONS OF A WORKPIECE
David M. A. Charpilloz, 7 Chemin de Perreaz, Prilly, Vaud, Switzerland
Filed Apr. 24, 1967, Ser. No. 633,072
Claims priority, application Switzerland, Apr. 26, 1966, 6,052/66
U.S. Cl. 33—174    10 Claims
Int. Cl. G01d 18/00

ABSTRACT OF THE DISCLOSURE

A travelling path is provided along which a workpiece to be gauged and the feeling head can be moved relative to each other. Feelers are arranged on the head along this path in order to engage the workpiece at the points where it has to be gauged. The feelers which can engage the workpiece by approaching the same from one and the same side are parallel to each other and they are associated with one and the same shiftable sole piece. Upon moving the workpiece and the feeling head relative to each other along said predetermined path, the feelers associated with the same sole piece successively engage the workpiece and displace the sole piece thus permitting the different dimensions of the workpiece to be successively measured.

BACKGROUND OF THE INVENTION

1. Field of the invention

This invention relates to gauging devices and more particularly to such devices which comprise a feeling head provided for gauging a plurality of dimensions of a workpiece, whereby at least one point of every portion of the workpiece to be gauged is successively engaged by a particular feeler which is connected to a measuring instrument at least at the moment at which said feeler engages the workpiece.

2. Description of the prior art

The possibilities of simultaneously measuring or checking a plurality of dimensions of a given workpiece are notoriously limited by the sizes of the feelers used for this purpose. With small workpieces, as well as with workpieces having a relatively intricate shape, gauging has to occur at points of the workpiece which lie extremely close to each other. In such cases it is thus no longer possible to provide a feeling head with feelers which could simultaneously engage the workpiece at the required points.

Feeling heads have therefore been constructed, in which the different dimensions of the workpiece are successively measured. There are accordingly known gauging devices which comprise a head carrying a plurality of feelers, each of which measures a predetermined dimension of the workpieces of a series.

Some known devices of this type are arranged for simultaneously gauging a predetermined set of workpieces. This is done in a predetermined sequence of operations. During the first operation of the sequence, all the feelers and the feeling head simultaneously engage any one workpiece of the set. A first predetermined group of feelers can thus engage a first workpiece of the set, a second predetermined group of feelers the second workpiece, etc. During the second operation of the sequence, the first group of feelers engages, for instance, the second workpiece of the set, the second group of feelers the third piece of the set, etc., the last group of feelers engaging the first piece of the set. During the different operations of the sequence, a predetermined group of feelers accordingly engages all the workpieces of the set successively. When the sequence of operations has ended, all the dimensions of the workpieces constituting said set have been measured. The set of pieces can thus be removed from the gauging device and be replaced by a new set of workpieces.

These known devices are, however, intricate and expensive. They comprise a measuring instrument associated with every feeler or group of feelers provided for gauging a predetermined portion of the workpieces. Moreover, indexing the head carrying the feelers requires cumbersome and delicate control means which can hardly afford the head to be displaced with a great precision.

Gauging devices are also known in the art, in which the different feelers of the feeling head are associated with one and the same measuring instrument. With these known devices, a group of connecting means is, however, associated with every feeler of the head. When one of these feelers engages the workpiece to be checked, the connecting means associated therewith move together with the feeler so as to establish the connection between the latter and the measuring instrument at least when the feeler engages a workpiece.

These known devices are still relatively intricate, because they comprise a separate group of connecting means for every feeler. The frictional wear occurring on the knob of the measuring instrument every time a new feeler is moved together with its connecting means toward the workpiece to be gauged can be a source of errors as well as the frictional wear occurring on the fixed support of the feelers upon indexing the latter.

The main object of the invention is now to provide an improved feeling head for gauging small and/or intricate workpieces, which can easily be manufactured and in which frictional wear cannot jeopardize the precision of the measuring operations.

SUMMARY OF THE INVENTION

With the feeling head improved according to the invention, the feelers provided for engaging the workpieces at points located on the same approaching side of the workpieces are connected to the measuring instrument by a single shiftable sole piece. This sole piece is, moreover, located in such a position relative to the feelers associated therewith that the latter move the sole piece while avoiding any friction between the feelers and the sole piece when the feelers engage the workpieces to be gauged.

BRIEF DESCRIPTION OF THE DRAWING

One embodiment and a modification thereof are represented diagrammatically and by way of example in the accompanying drawing, in which.

Figure 1:
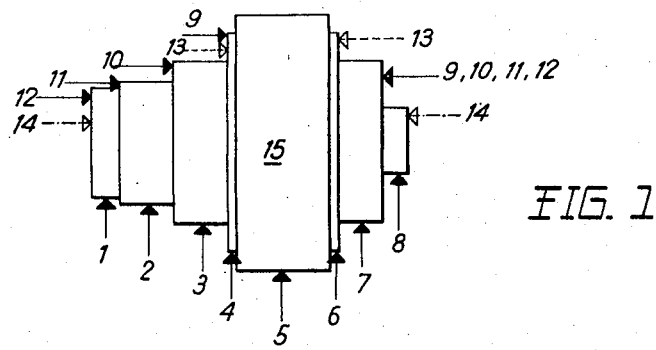
FIGURE 1 shows a piece to be gauged.

The feeling head represented in the drawing is arranged for gauging the different dimensions of the workpiece 15 represented in FIGURE 1. For the simplicity of the disclosure, it is supposed hereinafter that piece 15 constitutes the lathe-turned blank of the barrel arbor of a watch. Arrows 1 through 14 in FIGURE 1 indicate the different dimensions which are to be gauged. Arrow 1 thus indicates the measure of the diameter of the arbor portion on which a square prism will have to be milled for receiving the ratchet wheel, arrow 2 that of the arbor pivot journalled in the barrel bridge, arrow 3 that of the arbor portion on which the barrel cover member is pivoted, arrow 4 that of the shoulder against which the cover member axially butts, arrow 5 that of the hook carrying arbor portion, arrow 6 that of the shoulder against which the barrel axially butts, arrow 7 that of the arbor portion on which the barrel is pivoted, arrow 8 that of the arbor pivot journalled in the base plate of the watch movement, arrows 9 through 12 those of the heights of shoulder 4, portion 3, pivot 2 and portion 1, respectively, with respect to the arbor shoulder axially bearing on the base plate, arrows 13 that of the distance between the two shoulders serving as abutting means to the barrel and its cover member, and arrows 14 that of the height of the pivot by means of which the arbor is journalled in the base plate.

The fourteen measures indicated in FIGURE 1 are carried out successively by shifting arbor 15 through a canal 16 (FIGURE 4) of the feeling head. Canal 16 has a cross section with a shape corresponding to the contour of arbor 15. The sizes of canal 16 are adapted to those of arbor 15, so that this arbor can easily be shifted through canal 16, however, with the smallest possible free play in order to prevent jamming.

Figure 4:
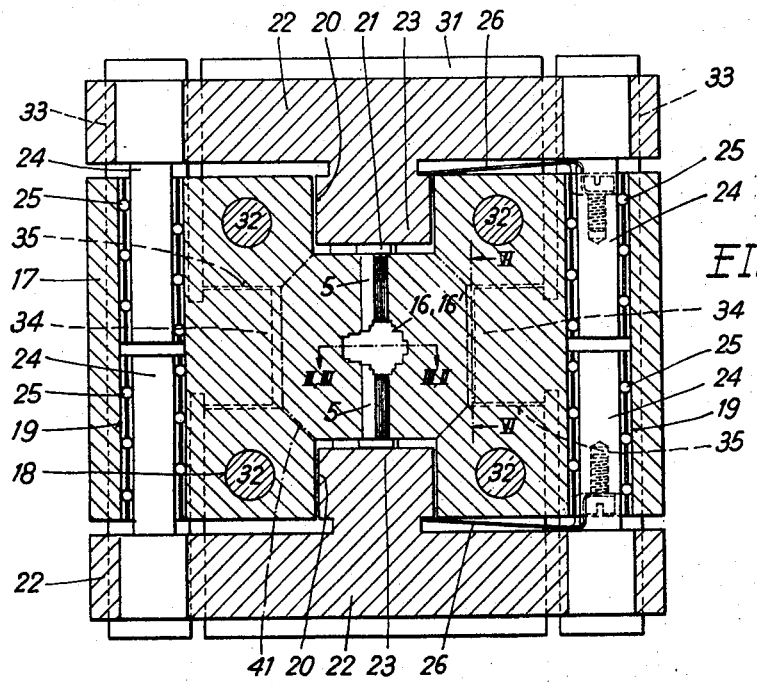
FIGURE 4 is a sectional view on a smaller scale along line IV—IV of FIGURE 5, wherein a modification is represented in dot-and-dash lines.
Figure 5:
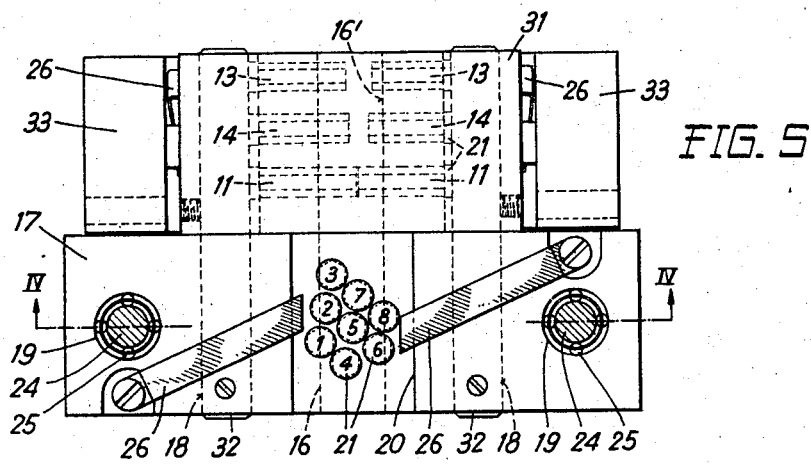
FIGURE 5 is a plan view of the feeling head on the same scale as FIGURE 4, one piece of the head having been cut away.

As shown in FIGURES 4 and 5, canal 16 is provided in a body member 17 of the feeling head, which is further provided with four borings 18 located at the corners of a square and extending in parallel with canal 16, as well as with two borings 19 which are perpendicular to canal 16. Two passages 20 are moreover provided in the opposed edges of body member 17, which are located above and below canal 16, these passages extending in parallel with canal 16. Body member 17 finally carries the eight pairs of feelers 1 through 8 measuring the different diameters indicated in FIGURE 1. The two feelers of every pair are coaxial. Each feeler extends from one of the two passages 20 to canal 16 through a guiding bore of body member 17. The feelers represented have a hexagonal cross-section and they are snugly fitted within the guiding bores of member 17, which have the same shape as the feelers. Every feeler has an abutting head 21 located in one of the two passages 20 and preventing the feeler from movnig toward the canal 16 beyond a predetermined position, which is the rest position of the feeler.

In another embodiment (not shown) the feeler 1 through 8 could be cylindrical and carry a prismatic abutting head, a part of which enters a guiding bore of body member 17 having a corresponding shape. In such an embodiment, the guiding bores of body member 17 could be made more easily since they need only be prismatic over a short portion of their length. Still further means can easily be imagined by those skilled in the art for preventing the feelers from rotating.

Figure 2:
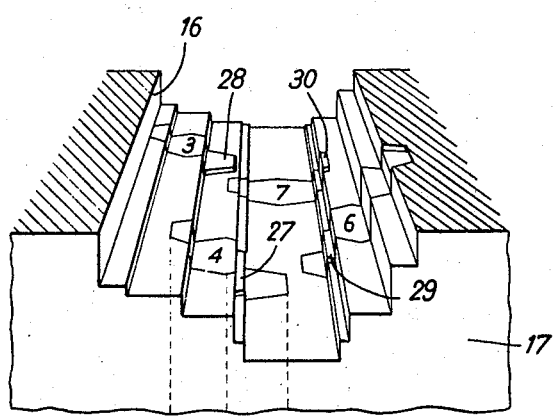
FIGURE 2 is a perspective view of a front part of the feeling head represented in FIGURE 4 which is cut along line II—II of FIGURE 4.

As more particularly shown in FIGURE 2 in which only four of the eight feelers have been represented, the end face of these feelers has been machined so that this end face exactly matches with the shape of the canal 16. With the exception of a small portion of the end face of every feeler, which protrudes within canal 16, this end face of the feelers is flush with canal 16 when the feeler head 21 butts on the bottom of the corresponding passage 20. Although the feelers have relatively large sizes with respect to the workpiece to be gauged, their guiding bores do not interrupt the canal 16 and cannot therefore cause any jamming when the arbor 15 is shifted through this canal.

The improved feeling head furthermore comprises two shiftable sole pieces 22, each of which carries a shoe 23. Each sole piece 22, moreover, carries two guiding rods 24 extending within bores 19 of member 17. Ball cages 25 afford a smooth sliding of the rods 24 within borings 19 so that sole pieces 22 are movable by translation in a predetermined direction with respect to member 17. The shoes 23 of sole pieces 22 extend within passages 20 of body member 17; they engage heads 21 of feelers 1 through 8. Spring blades 26 are mounted on body member 17 and they act on shoes 23 so as to hold normally the feeler heads 21 pressed on the bottom of passages 20. If the feeling head is actually used in the position represented in FIGURES 4 and 5, i.e. with a sole piece 22 at the bottom and the other at the top, springs 26 are dimensioned so that shoes 23 bear, at least approximately, with the same force on the heads of the lower and of the upper feelers.

Upon comparing FIGURE 2 with FIGURE 5, it can be noticed that FIGURE 2 shows, on the one hand, the feeler 4 which is the first one engaging arbor 15 when the same is moved through canal 16, and, on the other hand, the feeler 3 which is the last one engaging arbor 15 when the same is moved through canal 16. Although these two feelers stand relatively far away from each other, they nevertheless engage portions of arbor 15 which lie close to each other, as it appears in FIGURE 1. For this purpose, feeler 4 comprises a projection 27 which protrudes within canal 16. Feeler 3 similarly carries a projection 28 protruding within this canal. The corresponding upper feelers, which are not shown in FIGURE 2, are, of course, symmetrical to the lower feelers. When arbor 15 comes opposite the two coaxial feelers 4 in canal 16, its portion appearing immediately at the left of that having the largest diameter in FIGURE 1 is engaged by projections 27 of feelers 4. In order that the portion considered of arbor 15 can pass between the projections 27, feelers 4 have to be urged away from each other. This motion of the feelers produces a corresponding displacement of the sole pieces 22 thus permitting the diameter of the portion considered of arbor 15 to be measured. The adjacent portion on the left (FIGURE 1) of arbor 15 is gauged in the same way when arbor 15 comes opposite the two coaxial feelers 3. The projections 29 and 30 of feelers 6 and 7, respectively, similarly enable gauging the two neighbouring portions located on the right of that having the largest diameter in FIGURE 1.

By staggering a plurality of feelers along canal 16, as shown in FIGURE 5, it is thus possible to measure the diameter of any portion of a lathe-turned workpiece. The feelers can have relatively large sizes with respect to the pieces to be gauged. Even if the different portions to be gauged are very narrow, the feeler projections which engage those portions will not be delicate elements of the feelers which would be exposed to breaking in use.

Figure 6:
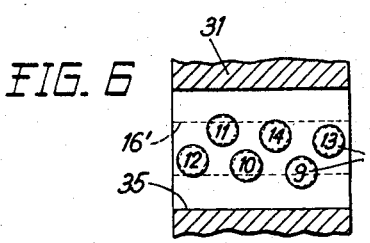
FIGURE 6 is a part sectional view along line VI—VI of FIGURE 4.

For carrying out the six gauging operations occurring in axial direction and indicated by arrows 9 through 14 in FIGURE 1, the improved feeling head comprises a second body member 31 having the same shape as body member 17 and being secured to the latter by means of the four pins 32 fitting bores 18 of body member 17 as well as corresponding bores of body member 31. The only difference between the two body members 17 and 31 consists in the orientation of the canal through which the workpieces to be gauged are moved. Instead of being parallel to the longer side of body member 31, as with the body member 17, the greater axis of the cross-section of canal 16' is parallel to the smaller side of body member 31. Since body member 31 is itself secured to body member 17 in a position turned through 90°, the canal 16' exactly coincides with the canal 16 and constitutes thus an extension thereof. Two shiftable sole pieces 33, which are indentical to sole pieces 22, are mounted on body member 31. Sole pieces 33, however, move in a horizontal direction. They are also provided with shoes 34 extending within passages 35 of body member 31. The latter carries the feelers 9 through 14 which are also paired like feelers 1 through 8. The two feelers of the same pair are located within coaxial guiding bores which extend from passages 35 to canal 16'. Instead of being perpendicular to the greater transverse axis of canal 16', as the guiding bores provided in body member 17, they are, however, parallel thereto. FIGURE 6 shows the manner in which feelers 9 through 14 are staggered along canal 16'.

Like feelers 1 through 8, the feelers 9 through 14 are arranged along canal 16', so that the workpiece to be gauged leaves one pair of feelers before it will be engaged by the next one.

Figure 3:
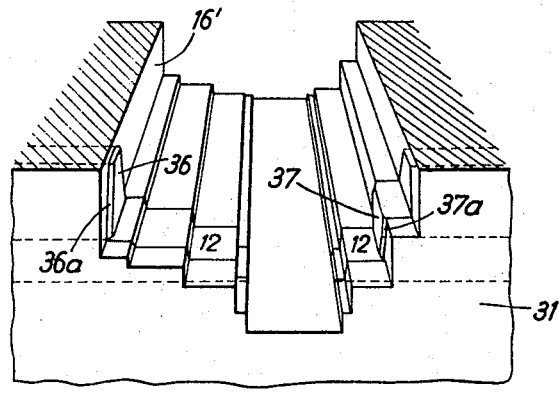
FIGURE 3 is a perspective view of a rear part of the feeling head, which is located behind the part shown in FIGURE 2 and which is cut along line III—III of FIGURE 4.

A single pair of horizontal feelers, the feelers 12, is represented more in detail in FIGURE 3. As it appears from FIGURE 1, feelers 12 measure the distance between the left end of arbor 16 and the arbor shoulder axially bearing on the base plate. Since the measuring operations in axial direction have to be carried out by engaging the arbor 15 at points which do not usually lie on a straight line extending in parallel with the arbor axis, the facing end faces of the two feelers of the same pair are no longer exactly symmetrical, as with the vertical feelers. The portions of these end faces, which are flush with canal 16', are still symmetrical, but not the projections of these feelers which protrude within canal 16'. The feeler 12 on the left in FIGURE 3 carries a projection 36 protruding in the largest portion of canal 16' provided for the passage of the ratchet wheel receiving portion of arbor 16, while the feeler 12 on the right carries a projection 37 which protrudes in a narrower portion of canal 16'. In order to prevent arbor 15 from being stopped by the projections of feelers 9 through 14, the edges of these projections are bevelled as shown at 36a and 37a in FIGURE 3.

Upon shifting arbor 15 through canal 16', the pairs of horizontal feelers 9 through 14 also cause sole pieces 33 to move away from each other. Upon shifting arbor 15 through canals 16 and 16', the feelers of the pairs 1 through 14 are successively urged away from each other, thus causing, firstly, sole pieces 22 to be moved away from each other eight times successively, and secondly, the sole pieces 33 to be moved away from each other six times successively. These successive displacements of sole pieces 22 and 33 need only be measured, for instance at a predetermined point of every sole piece, in order to gauge the fourteen arbor portions indicated in FIGURE 1.

Figure 7:
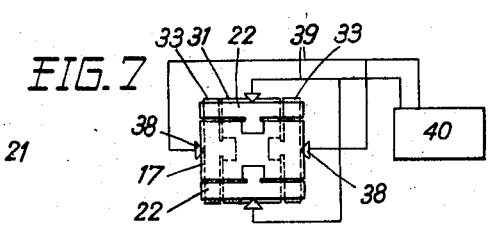
FIGURE 7 is a diagrammatic showing on a still smaller scale of a gauging device with which the feeling head improved according to the invention can be associated.

As shown in FIGURE 7, measuring the displacements of sole pieces 22 and 33 can be effected by setting the knobs 38 of four measuring instruments in contact with every sole piece at a predetermined point. By using electronic measuring instruments, the four instruments in question can be connected by means of leads 39 to a central apparatus 40. The latter can comprise an automatic registering device and an optical indicator so as to enable classifying the gauged pieces according to the results of the measuring operations. Apparatus 40 can, of course, also be used for automatically controlling a classifying device of the gauged workpieces. If the workpieces to be gauged are those which are just produced by an automatic machine-tool, the apparatus 40 can be connected to control means of the machine in order either to stop the same as soon as one dimension of the workpieces comes to lie beyond the tolerances or to correct the controlling means of the machine when the same starts producing workpieces with some dimensions differing from the nominal value.

For driving the workpieces to be gauged through canals 16 and 16' different means can be used. The workpieces could firstly be brought after one another by a distributor in a predetermined position opposite the opening of canal 16. A reciprocating pusher could then urge the workpiece lying in said position through canals 16, 16' and return to its rest position for enabling the next workpiece to be set in place at the opening of canal 16. An endless tape provided with openings or with notches could also drive the workpieces through canals 16, 16', said tape moving through a horizontal or vertical slot provided in body members 17 and 31. The workpieces to be gauged could be set either manually or automatically into the openings or the notches of such a tape. Instead of holding the feeling head in a position in which the canals 16, 16' are horizontal, the feeling head could also be held in a position in which these two canals would be inclined or even vertical. In such a case, moving the workpieces through these canals could be ensured by gravity. In some cases in which the number of measuring operations to be carried out and in which the means provided for registering the results of these operations permit it, one could also push an uninterrupted row of workpieces through the canals of the feeling head.

Since the canal through which the workpieces to be gauged are driven must have sizes corresponding to those of these workpieces, the embodiment represented in the drawing only permits series of workpieces having a predetermined shape to be gauged. The modification represented in dot-and-dash lines in FIGURE 4 enables using the same feeling head for gauging workpieces having different shapes. This modification differs from the embodiment described above in that the feelers are no longer carried by the body members on which the measuring sole pieces are mounted, but by a core 41 having an octogonal cross-section and carrying both the vertical and the horizontal feelers, and in which is provided a canal having a cross-section corresponding to the contour of one predetermined piece to be gauged. In this modification the sole pieces 22 are shiftably mounted by means of their guiding rods 24 onto a pair of identical supporting pieces which are secured to each other by pins 32 and which are located on the left and on the right, respectively, of core 41 and of shoes 23. Sole pieces 33 are similarly shiftably mounted onto a pair of supporting pieces which are identical to the first ones and which are secured to each other by means of the same pins 32, but which are located above and below core 41 and shoes 34. In order to enable gauging workpieces having different shapes, it suffices to replace core 41 by another one. Removably fixing core 41 within the frame constituted by the four pieces supporting the measuring sole pieces can be ensured, for instance by means of four locking pins of gauged sets, said pins being located within slots (not shown) provided in the inclined faces of core 41 in a direction parallel to the axis of this core.

Further embodiments of the improved feeling head are still possible. One could thus resort to an embodiment which would be simpler than that represented in the drawing, and in which the shoes of a pair of measuring sole pieces would butt against each other. The canal through which the workpieces have to be shifted would then be formed in part in one and in part in the other shoe of these sole pieces. As regards the projections such as 27 to 30, 36 and 37 which engage the workpieces to be gauged, they could be rigidly connected to the sole pieces, either by fixing them thereto or by making them in one piece therewith. With such an embodiment, it would be possible to distribute the elements protruding within the guiding canal of the workpieces in such a way along this canal, that measuring could be effected at points of the workpieces which are close to each other and this by means of projections having sizes larger than the distances between said points.

According to the shape of the pieces to be gauged, it could be advisable to use a feeling head in which measuring one dimension would not simply be carried out by means of two opposed feelers, but by means of a group of three or even more feelers arranged fan-wise. In such an event, the feeling head should obviously be provided with as many shiftable sole pieces as there are feelers participating in the same measuring operation, these sole pieces being perpendicular to the feelers in order to avoid any friction between the feelers and the sole pieces.

It would finally also be possible to use a feeling head comprising only one shiftable sole piece. In this case, the pieces to be gauged would be held by any appropriate means in a fixed position. The feelers would be arranged along a bar carrying said sole piece, this bar being moved along a predetermined path with respect to the workpiece to be gauged, for instance in a direction perpendicular to the workpiece axis thus successively bringing every feeler in engagement with the workpiece.

The invention may be embodied in other specific forms without departing from the spirit or essential characteristics hereof. The embodiment and the modific action described are therefore to be considered in all respects as illustrative and not restrictive.

What is claimed is:

1. In a feeling head for gauging workpieces and comprising a plurality of feelers which successively engage one of the workpieces to be gauged at predetermined points upon moving the workpieces and the head relative to each other along a predetermined path, the improvement comprising a sole piece shiftable transversely of said path, those of said feelers which engage the workpieces at points located on the same approaching side of the workpiece being associated with said shiftable sole piece to displace same, and a measuring instrument responsive to the displacement of said sole piece.

2. A feeling head according to claim 1, in which the feelers associated with said sole piece are perpendicular thereto.

3. A feeling head according to claim 1, in which is provided a canal having in cross-section the shape of the contour of the workpieces to be gauged, the sizes of said canal being adapted to those of the workpieces to be gauged in such manner that said pieces may smoothly be shifted along said canal, but with the smallest possible free play, said feelers being staggered along said canal so as to successively come into engagement with the workpieces shifted therethrough.

4. A feeling head according to claim 3, comprising at least two measuring sole pieces which are shiftable in the same direction and which butt against one another when the feeling head is at rest, said canal being provided in part in one of said sole pieces and in part in the other sole piece, and feelers being rigidly connected to said sole pieces.

5. A feeling head according to claim 3, said canal being provided in a body member provided with guiding bores for the feelers and carrying the same.

6. A feeling head according to claim 5, each feeler coming into engagement with the workpieces to be gauged by means of a feeling element projecting from its end face and extending only over a part of this end face, the remaining part of said end face being flush with said canal.

7. A feeling head according to claim 5, the body member being provided with said canal and carrying said feelers consisting of a core removably fixed to a frame carrying said shiftable sole pieces.

8. A feeling head according to claim 5, said canal having a first portion of its length along which a first group of said feelers are staggered and extend in a first predetermined direction and another portion of its length along which a second group of said feelers are staggered and extend in a second predetermined direction, a separate sole piece being associated with each group of parallel feelers.

9. A feeling head according to claim 1, comprising a group of said feelers participating in one and the same measuring operation, one separate sole piece being associated with each one of the feelers participating in the same measuring operation.

10. A feeling head according to claim 1, comprising only one sole piece shiftably mounted on a bar which is itself shiftable in a predetermined direction, said bar being provided with guiding bores staggered along said bar and associated feelers being shiftably inserted in said bores.

References Cited

UNITED STATES PATENTS 2,844,877   7/1958   Mogolis.
3,080,659   3/1963   Wolford.
3,257,730   6/1966   Welfare et al.

SAMUEL S. MATTHEWS, *Primary Examiner.*